(12) United States Patent
Palmieri

(10) Patent No.: US 7,406,234 B2
(45) Date of Patent: Jul. 29, 2008

(54) METHOD FOR DETERMINING SPIN CHARACTERISTIC PARAMETERS IN SPUN OPTICAL FIBERS

(75) Inventor: Luca Palmieri, Padua (IT)

(73) Assignee: Prysmian Cavi e Sistemi Energia S.r.L., Milan (IT)

( * ) Notice: Subject to any disclaimer, the term of this patent is extended or adjusted under 35 U.S.C. 154(b) by 0 days.

(21) Appl. No.: 10/590,114

(22) PCT Filed: Feb. 20, 2004

(86) PCT No.: PCT/EP2004/050173

§ 371 (c)(1),
(2), (4) Date: Aug. 18, 2006

(87) PCT Pub. No.: WO2005/080936

PCT Pub. Date: Sep. 1, 2005

(65) Prior Publication Data

US 2007/0132985 A1    Jun. 14, 2007

(51) Int. Cl.
  *G02B 6/02*  (2006.01)
  *G01N 21/00*  (2006.01)
(52) U.S. Cl. .................... 385/123; 356/73.1
(58) Field of Classification Search .............. 385/123, 385/147; 356/73.1
  See application file for complete search history.

(56) References Cited

U.S. PATENT DOCUMENTS

| | | | |
|---|---|---|---|
| 5,418,881 A | 5/1995 | Hart, Jr. et al. | |
| 5,943,466 A | 8/1999 | Henderson et al. | |
| 6,229,599 B1 | 5/2001 | Galtarossa | |
| 6,920,270 B2 * | 7/2005 | Galtarossa et al. | 385/123 |
| 2001/0020374 A1 | 9/2001 | Roba et al. | |

FOREIGN PATENT DOCUMENTS

| | | |
|---|---|---|
| GB | 2 101 762 A | 1/1983 |
| WO | WO-01/37459 A1 | 5/2001 |

OTHER PUBLICATIONS

Eillison et al.; "Using Polarimetric Optical Time Domain Reflectometry to Extract Spun Fibre Parameters"; IEE, Proc.-Optoelectron, vol. 148, No. 4, pp. 176-182, (2001).

Galtarossa et al.; "Statistical Characterization of Fiber Random Birefringence"; Optics Letters, vol. 25, No. 18, pp. 1322-1324, (2000).

(Continued)

*Primary Examiner*—Sarah Song
(74) *Attorney, Agent, or Firm*—Finnegan, Henderson, Farabow, Garrett & Dunner, L.L.P

(57) ABSTRACT

A method of determining characteristic spin parameters of a spun optical fiber by performing optical time-domain reflectometry measurements on the fiber, so as to obtain a state of polarization spatial function from a backscattered electromagnetic field, the state of polarization spatial function being defined by a plurality of components; and processing the state of polarization spatial function. The process includes calculating a further spatial function related to the spatial first derivative of at least one of the components of the state of polarization spatial function; identifying a spatial periodicity of the further spatial function; and determining the characteristic spin parameters as a function of the spatial periodicity.

11 Claims, 9 Drawing Sheets

OTHER PUBLICATIONS

Galtarossa et al.; "POTDR Techniques for Measurement of Fiber Birefringence Properties", Optical Society of America, Institute of Electrical and Electronics Engineers, OFC, Technical Digest Postconference Digest, vol. 70, pp. 174-175, (2002).

Galtarossa et al., "PMD statistical properties of constantly-spun fibers", ECOC-IOOC 2003 Proceedings, vol. 4, Th. 1-7.4, 2 pages, (2003).

Galtarossa et al., "Polarization mode dispersion properties of constantly spun randomly birefringent fibers", Optics Letters, vol. 28, No. 18, pp. 1639-1641, (2003).

X. Chen et al., "Properties of polarization evolution in spun fibers"; Optics Letters, vol. 28, No. 21, pp. 2028-2030, (2003).

Corsi et al., "Beat length characterization based on backscattering analysis in randomly perturbed single-mode fibers", Journal of Lightwave Technology, vol. 17, No. 7, pp. 1172-1178, (1999).

Galtarossa et al., "Measurement of beat length and perturbation length on long single-mode fibers", Optics Letters, vol. 25, No. 6, pp. 384-386, (2000).

Galtarossa et al., "Measure of twist-induced circular birefringence in long single-mode fibers: Theory and experiments" Journal of Lightwave Technology, vol. 20, No. 7, pp. 1149-1159, (2002).

International Telecommunication Union, ITU-T Recommendation G.652, Series G: Transmission Systems and Media, Digital Systems and Networks, Transmission media characteristics—Optical fibre cables, "Characteristics of a single-mode optical fibre and cable", pp. i-iii and 1-13, (2003).

A.J. Barlow et al., "Anisotropy in spun single mode fibers", Electronics Letters, vol. 18, No. 5, pp. 200-202, (2003).

* cited by examiner

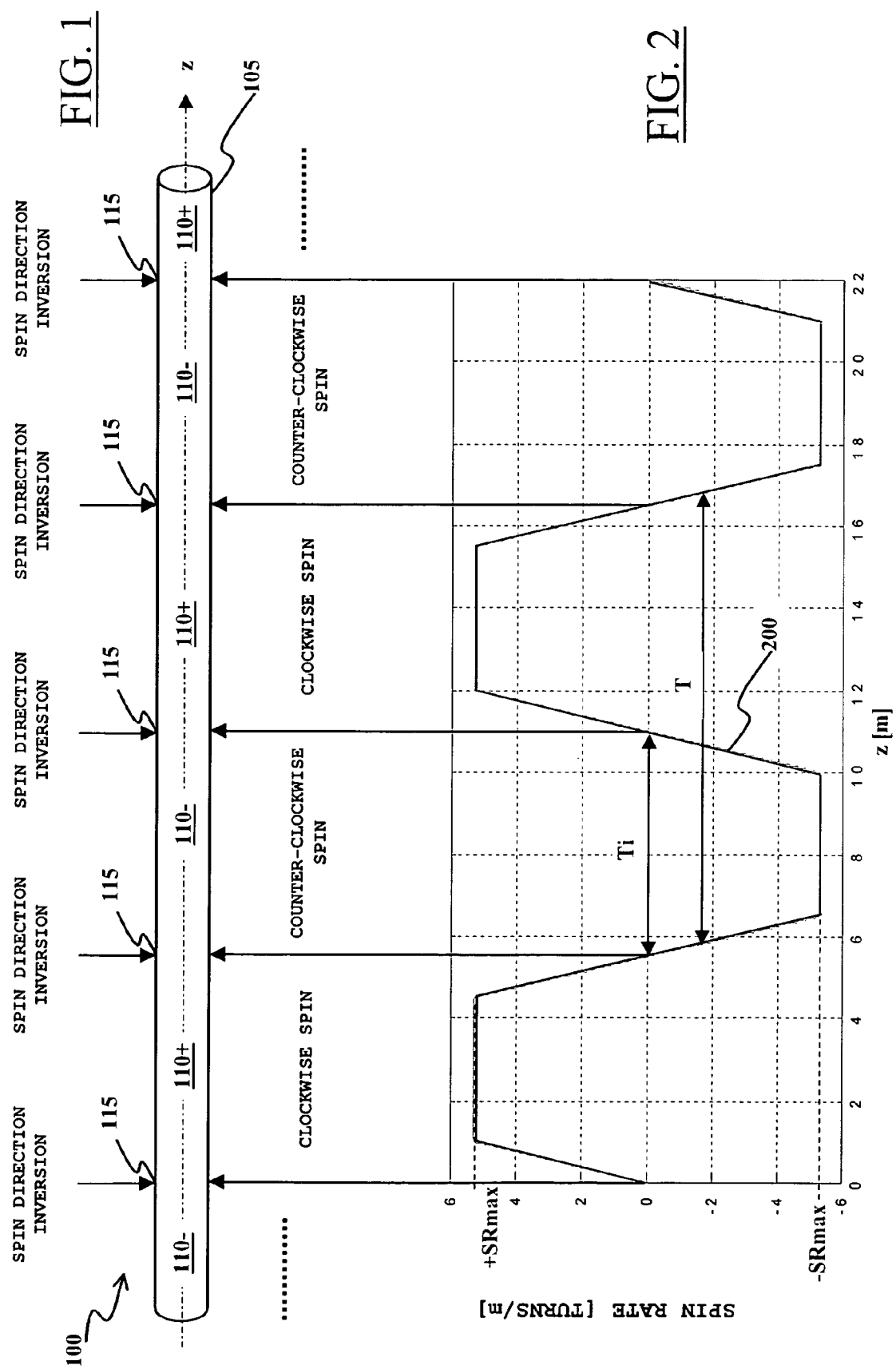

METHOD FOR DETERMINING SPIN CHARACTERISTIC PARAMETERS IN SPUN OPTICAL FIBERS

The present invention generally relates to the field of optical fibers, their manufacturing, characterization and measurement. In particular, the invention relates to optical fibers for applications where low Polarization Mode Dispersion (shortly, PMD) is required, and namely to spun optical fibers. More specifically, the invention concerns a method suitable for determining spin characteristic parameters of spun optical fibers.

Optical signals transmitted through single-mode optical fibers comprise two orthogonal polarization modes (typically denoted Transverse Electric, or TE, and Transverse Magnetic, or TM). In case the fiber has a perfectly cylindrical core of uniform diameter, the two modes TE and TM propagate at a common velocity. However, in real optical fibers the cylindrical symmetry of the core may be disrupted due to shape defects or non-uniform stresses. As a result, a phase difference can accumulate between the two modes as they propagate, and the fiber is said to exhibit "birefringence". In particular, the birefringence introduced by shape and stress asymmetry is known as "intrinsic linear birefringence".

The structural and geometrical irregularities of the optical fiber that give rise to birefringence typically originate from the fiber preform itself, and are modified during the process of drawing the fiber. This process is usually carried out by means of an apparatus known as a "drawing tower", starting from a glass preform. In practice, after the preform has been placed in vertical position and heated to a temperature above the softening point within a suitable furnace, the molten material is drawn downwards at a controlled velocity in such a way as to produce a threadlike element that forms the optical fiber itself. In this process, asymmetrical stresses are typically applied to the fiber.

In a birefringent fiber, the two components TE and TM of the fundamental optical mode, initially in phase with each other, return to be in phase again only after a certain propagation length, commonly known as the "beat length" ($L_B$). In other words, the beat length is the period of repetition of a certain state of polarization (on the assumption that the fiber maintains a constant birefringence over this length). A further characteristic parameter of a birefringent fiber is the "correlation length" ($L_F$), which is defined as the distance over which the autocorrelation function of the birefringence is 1/e times its maximum value.

In the so-called "polarization-preserving" optical fibers, asymmetry is deliberately introduced into the fiber to generate birefringence. However, in ordinary (i.e., non-polarization-preserving) fibers, birefringence is detrimental to the fiber performance.

In fact, when pulsed signals are transmitted into an optical fiber, birefringence is a cause of pulse spreading, since the two polarization components, TE and TM, travel at different group velocities (i.e. become dispersed). This phenomenon, known as Polarization Mode Dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performances in transmission and reception.

U.K. patent application GB-A-2101762 considers the effects on PMD of a twist applied on the fiber (about its axis) after it has been drawn and observes that, although such twist reduces the PMD resulting from intrinsic linear birefringence, it introduces torsional stresses that generate a substantial circular birefringence due to the photo-elastic effect. Twisting a drawn fiber thus reduces the bandwidth limitation due to one effect, whilst replacing it with another. The same patent application thus proposes to spin the preform during drawing, so that a torsion can be applied to the fiber whilst keeping the fiber material substantially unstressed. Spinning is performed at a relatively high rate, so that its spatial repetition frequency, or spin pitch, is small compared to the beat length due to intrinsic birefringence; as a result, an optical fiber can be produced wherein the contribution of birefringence due to form and stress asymmetries is greatly reduced. Such a fiber is termed "spun" fiber, to distinguish it from a (post-drawn) twisted fiber. Conveniently, the preform is spun at a substantially constant rate, but it could even reverse in direction, oscillating from a right-handed to a left-handed spin.

The terms "spin" and "twist" are used, in the context of the present description, to identify two different types of torsion of the fiber: "spin" identifies a torsion that is frozen-in during drawing, being applied to a viscous portion of the fiber and kept as a structural modification of the fiber while cooling; differently, "twist" identifies an elastic torsion of the fiber, which is present when a torque is applied to a portion of fiber whose ends are constrained against rotation. In other words, although both spin and twist alter the fiber in shape, so that parts previously in the same straight line are located in a spiral curve, a twisted fiber will rotate back to its original shape when its ends are released from the rotation constraint, while a spun fiber will keep this alteration as an intrinsic and permanent deformation.

Due to spinning, the fiber undergoes a rotation of its polarization axes. As a result, when optical pulses are transmitted into the optical fiber, they propagate alternately on the slow and fast birefringence axes, thus compensating the relative delay and reducing the pulse spreading.

Spinning the fiber by rotating the preform during drawing has the drawback that only relatively low spin rates can be achieved.

An alternative technique has therefore been proposed, consisting in rotating the fiber during drawing (instead of the preform). Accordingly, spinning devices have been realized that are suitable to rotate the fiber about its axis during drawing, which rotation propagates upstream to the viscous portion of the fiber (i.e. the initial portion of the fiber, which is formed inside the drawing furnace) and is then kept as a structural modification of the fiber while cooling.

Theoretical studies have shown that the dominant process for the reduction of PMD in a spun fiber is the averaging of the local fiber anisotropy by the rapid procession of the axes of asymmetry along the fiber.

The spin of the fiber can be applied at a substantially constant rate and in a same direction (either right-handed, i.e. clockwise, or left-handed, i.e. counter-clockwise); in this case, the fiber obtained is said to be a "unidirectionally-spun" optical fiber.

However, unidirectional spinning has been considered impractical. In fact, if the spin is imparted by rotating the fiber, an elastic torsion is accumulated downstream the point where the spin is imparted. Differently, if the spin is imparted by rotating the perform, the spin rate can be insufficient, as previously stated.

Alternatively, the spin rate may vary (i.e., be not constant) and may reverse in direction, oscillating from a right-handed to a left-handed spin, thereby obtaining a so-called "alternately-spun" optical fiber. In the art, alternately-spun optical fibers have often been considered preferable over their unidirectionally-spun counterparts.

For example, the U.S. patent U.S. Pat. No. 5,418,881 states that applying a clockwise and a counter-clockwise torque to the fiber substantially prevents introduction of an elastic twist in the fiber. That patent describes a device by which a torque is applied to the fiber by alternately canting in clockwise and counter-clockwise direction a fiber guiding roll having a rotation axis which extends perpendicularly to the drawing axis of the fiber. In this way, in at least a portion of the fiber the spin impressed to the fiber is alternately clockwise and counter-clockwise.

The U.S. patent application N. US2001/0020374 proposes a new device that overcomes some drawbacks of the canting-roll technique and allows both unidirectional and alternate spinning, but it also states that alternate spinning is to be considered preferable, since it prevents the presence of residual torsions (i.e., of a residual twist) on the fibers wound onto the collecting spool, thus making easier both the unwinding and wiring operations of the same.

In the U.S. patent U.S. Pat. No. 5,943,466, it is proposed to spin the fiber during drawing in accordance with spin functions which are not substantially constant (in the sense that they change substantially as a function of distance along the length of a fiber or as a function of time), not substantially sinusoidal, and have sufficient variability (e.g. sufficient harmonic content) to provide a substantial reduction in PMD for a plurality of beat lengths.

In a spun optical fiber the so-called "spin function" (also referred to as "spin profile") defines the number of turns per meter imparted to the fiber during drawing versus the position along the fiber.

The paper by A. Galtarossa et al., "PMD statistical properties of constantly-spun fibers", ECOC-IOOC 2003 Proceedings, Vol. 4, Th. 1.7.4, and the paper by A. Galtarossa et al. "Polarization mode dispersion properties of constantly spun randomly birefringent fibers", Optics Letters, Vol. 28 No. 18, September 2003, pp. 1639-1641 report the PMD-induced delay (i.e. the mode delay—in ps—induced by PMD or, equivalently, the mean fiber Differential Group Delay, or "DGD") of unidirectionally-spun fibers. It can be shown that, while in an unspun fiber or an alternately spun fiber the PMD-induced delay increases proportionally to the square root of the fiber length, in a unidirectionally-spun fiber the PMD-induced delay has a higher increase rate, and asymptotically increases proportionally to the square root of length. In particular, the PMD-induced delay in a unidirectionally-spun fiber asymptotically increases at the same rate as the PMD-induced delay of an unspun fiber having the same beat length $L_B$ and the same correlation length $L_F$.

Generally, and especially in case of variable rates spinning and alternate spinning, the spinner device is submitted to acceleration and friction, and so to forces that reduce its mechanical efficiency with use, requiring maintenance. A detrimental effect of this degradation is that the movement of the spinner device does not cause a correspondent rotation of the fiber. As a result, the spin profile actually imparted to the fiber may be different from the prefixed spin profile, with a consequent less effective reduction of PMD.

An important parameter of the spin function, which can be affected by the above problems, is for example the spin period. This parameter is typically optimized, together with the spin amplitude, to better reduce the PMD, so it is important that the spin period actually imparted to the fiber is very close to the prefixed one.

In view of the above, it would therefore be desirable to have a technique allowing to measure at least some of the parameters of the spin profile actually imparted to the fiber, such as the spin period and, more particularly, the spin inversion position along the fiber.

A technique allowing to determine spinning features of a fiber would also be useful for other reasons.

For example, sometimes it is required to measure the PMD of cabled fibers, such as in already installed optical cable links. The PMD of cabled fibers can me measured by well-known techniques. Variations of PMD with time, temperature, and vibrations, can be exploited to repeat the measurement in order to achieve a good statistics. The Applicant has verified that the statistical distribution of PMD measurement on a spun fiber is different from that of an unspun fiber. In particular, in the same measurement conditions, the statistical distribution of a spun fiber is much narrower (i.e. the measurement is more precise) than that of an unspun fiber. Therefore, while in case of a spun fiber a single PMD measurement may be sufficient, for an unspun fiber a single PMD measurement may be poorly representative. Typically, the type of fibers included in an optical cable is not an information available when the measurement is to be made. Moreover, an optical cable link generally includes a plurality of cable trunks (typically of 2-8 km length) which may include fibers of different types (i.e., spun fibers and unspun fibers). So, it may happen that a spun fiber of a cable trunk is serially connected to an unspun fiber of an adjacent trunk.

Since measuring the PMD of fibers in cables is time consuming (because the two ends of the fiber, usually very far from each other, must be simultaneously accessed to take the measurement), and since the number of times the measurement has to be repeated in order to have a sufficiently accurate result depends on the type of fibers involved, a technique allowing to identify the types of fibers (i.e. spun or unspun) and the position of the different types of fibers in the link would be very useful. If unspun fibers are present in the link, the PMD measurement could be advantageously repeated only in the corresponding cable trunks.

A well known optical measuring technique, called "Polarimetric Optical Time Domain Reflectometry" or briefly "POTDR", has recently been proposed for measuring spinning parameters of a spun fiber.

The paper by J. G. Ellison et al., "Using polarimetric optical time domain reflectometry to extract spun fiber parameters", IEE Proc.-Optoelectron., Vol. 148, No. 4, August 2001, pp. 176-182 shows that the spatial frequencies in a POTDR trace in conjunction with the backscattered State Of Polarization (SOP) evolution can determine the spinning parameters of the spun fiber, and that such a technique can be used to check whether the intended spinning parameters are in fact being impressed on the fiber during manufacture.

In the following of the present description the acronym "POTDR" will be used also to identify the corresponding measurement instrument, i.e. the reflectometer, while the acronym OTDR will indicate the apparatus of the POTDR that performs processing of the backscattered signal (as described in greater detail in the following).

However, the extraction of the spin period from the backscattered State Of Polarization (SOP) components measured by a POTDR is possible only in principle, because according to the authors of that paper, there are a number of problems involved. In particular, the authors admit that it is difficult to determine the global SOP evolution or extract any meaningful information from the trace, that the SOP is very sensitive to twist rate, and that extraction of the spin amplitude relies on a prior measurement of the initial birefringence in the fiber.

For these reasons, the authors propose a method that provides for twisting the spun fibers at different rates, and perform a frequency analysis of the SOP at each twist rate.

The Applicant observes that this alternative solution is not satisfactory, because it limits the maximum measurable length to few tens of meters, and so it requires a high spatial resolution of the OTDR.

X. Chen et al., "Properties of polarization evolution in spun fibers", Optics Letters, Vol. 28, No. 21, November 2003 states that the evolution of the state of polarization in sinusoidally spun fibers exhibits periodicity, which can be measured by distributed measurement, such as those made with a POTDR.

The Applicant observes that the technique proposed by X. Chen et al. is actually a measure of the DGD of the spun fiber, rather than a measure of the spin characteristic parameters. Additionally, the technique has been developed for sinusoidally spun fibers only, and the theory and simulations relate to deterministic fibers.

Use of the POTDR technique to measure fiber parameters is further described in the following articles.

In the papers by F. Corsi et al., "Beat length characterization based on backscattering analysis in randomly perturbed single-mode fibers", Journal of Lightwave Technology, Vol. 17, No. 7, July 1999, pp. 1172-1178, and A. Galtarossa et al., "Measurements of beat length and perturbation length in long single-mode fibers", Optics Letters, Vol., 25, No. 6, Mar. 15, 2000, pp. 384-386, it is shown theoretically and experimentally how the average birefringence (i.e., the mean beat length) of single-mode fibers can be measured basing on POTDR.

In the paper by A. Galtarossa et al., "Statistical characterization of fiber random birefringence", Optics Letters, Vol. 25, No. 18, Sep. 15, 2000, pp. 1322-1324, a technique is proposed that, based on POTDR, provides a complete statistical characterization of a fiber's local birefringence.

In the further paper by A. Galtarossa et al., "Measure of twist-induced circular birefringence in long single-mode fibers: theory and experiments" a method for circular birefringence measurement is proposed that is based on polarization-sensitive optical time-domain reflectometry. In particular, to measure parameters such as the correlation length, the beat length, the backscattered field SOP is firstly measured by means of a POTDR; then, the round-trip birefringence vector is derived from the evolution of the SOP, and once the birefringence vector is obtained, the power spectral density of its components is estimated; afterwards, the parameters of interest are determined performing a least squares fit.

The Applicant observes that the technique is intended to measuring the period of a constant, unidirectional twist in single-mode fibers.

In view of the state of the art outlined in the foregoing, it has been an object of the present invention to devise a solution to the problem of evaluating optical fiber properties as far as PMD is concerned.

In particular, the present invention provides a method by means of which the spin characteristics of a spun optical fiber can be easily determined, from the very basic fact that the fiber is spun to more detailed information such as the spin inversion period.

The Applicant has found that the first spatial derivative of at least one of the components of the SOP spatial function obtained by the POTDR technique can be exploited to determine characteristic spin parameters.

In fact, the SOP function is formed by a plurality of components (such as the quantities $S_0$, $S_1$, $S_2$, $S_3$ in the Stokes representation) and at least one of these components ($S_1$, $S_2$, $S_3$ in the Stokes representation) has a first spatial derivative showing a periodicity corresponding to the spin inversion period. Therefore, by performing the first spatial derivative of these components a spatial function is obtained, from which it is possible to derive the unknown spin period. The Applicant has moreover found that a particularly suitable spatial function is the (round trip) birefringence module, which is obtained by performing the first spatial derivative of the Stokes unit vector $S_B(z)$.

In fact, the fiber birefringence modulus shows more or less pronounced peaks which, in the exemplary case of an alternately-spun fiber, are located in correspondence of the inversion sites of the spin profile; more generally, the Applicant has found that, in the general case of fibers spun with a variable (not necessarily alternated) spin function, such peaks correspond to sites along the fiber whereat the spin rate slows down of such an extent that the consequent birefringent measurement sensibly changes.

Therefore, according to an aspect of the present invention, a method as set forth in the appended independent claim 1 is provided.

In brief, the method comprises:

performing optical time-domain reflectometry measurements on the fiber, so as to obtain a State Of Polarization (SOP) spatial function from a backscattered electromagnetic field, said SOP spatial function being defined by a plurality of components, and processing the SOP spatial function.

Said processing comprises:

calculating a further spatial function related to the spatial first derivative of at least one of said components of the SOP spatial function;

identifying a spatial periodicity of said further spatial function; and determining said characteristic spin parameters as a function of said spatial periodicity.

In particular, said characteristic spin parameters include at least one between a spin inversion period and a spin period.

In a preferred embodiment of the invention, said further spatial function is a birefringence modulus.

Said determining the characteristic spin parameters may include locating peaks in the birefringence modulus, and determining the spin inversion period based on a distance between the peaks.

In an embodiment of the present invention, the method may further comprise:

calculating a spectrum of the birefringence modulus;

analyzing the calculated spectrum to locate at least one spike; and determining the spin inversion period based on spatial frequency of the spike.

The spectrum may be calculated in correspondence of a measurement window of optical fiber length of prescribed width, and the measurement window is caused to shift along the fiber.

In an embodiment of the invention, said performing optical time-domain reflectometry measurements on the fiber and calculating a further spatial function related to the spatial first derivative of at least one of said components of the SOP spatial function is repeated at least once after changing the fiber conditions.

The fiber conditions may be changed by changing a fiber end at which the optical time domain reflectometry measurements are performed, and/or vibrating the fiber, and/or causing the fiber temperature to vary, and/or waiting a time before repeating the measurements.

According to another aspect of the present invention, an apparatus for determining spin characteristic parameters of a spun optical fiber as set forth in the appended independent claim 9 is provided for.

Summarizing, the apparatus comprises:

a source of electromagnetic radiation optically coupled to the fiber;

a POTDR measurement apparatus optically coupled to the fiber to obtain a State Of Polarization (SOP) spatial function from a backscattered electromagnetic field, said SOP spatial function being defined by a plurality of components; and a data processor for processing the SOP spatial function.

The data processor is adapted to:

calculate a further spatial function related to the spatial first derivative of at least one of said components of the SOP spatial function;

identify a spatial periodicity of said further spatial function; and determine said characteristic spin parameters as a function of said spatial periodicity.

In a preferred embodiment of the invention, said further spatial function is a birefringence modulus.

These and other features and advantages of the present invention will be made apparent by the following detailed description of an embodiment thereof, provided merely by way of non-limitative example, description that will be conducted making reference to the attached drawings, wherein:

FIG. 1 is a very schematic, pictorial view of a section of a spun optical fiber;

FIG. 2 shows in diagrammatic form a simple, exemplary spin function (turns/m in ordinate vs fiber length, in meter, in abscissa) applied to the optical fiber of FIG. 1 during a drawing process thereof;

Figure 3:
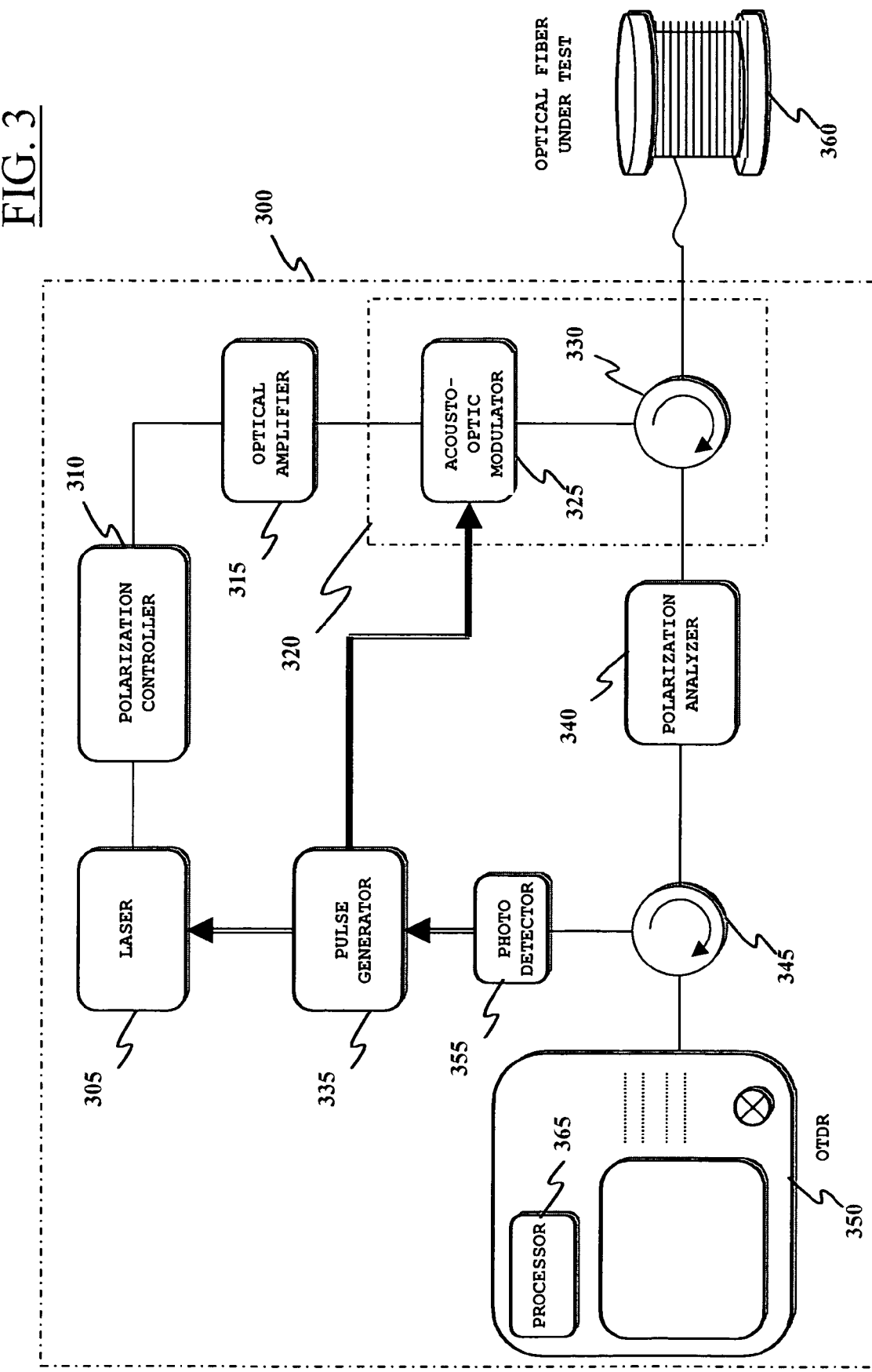
Figure 4:
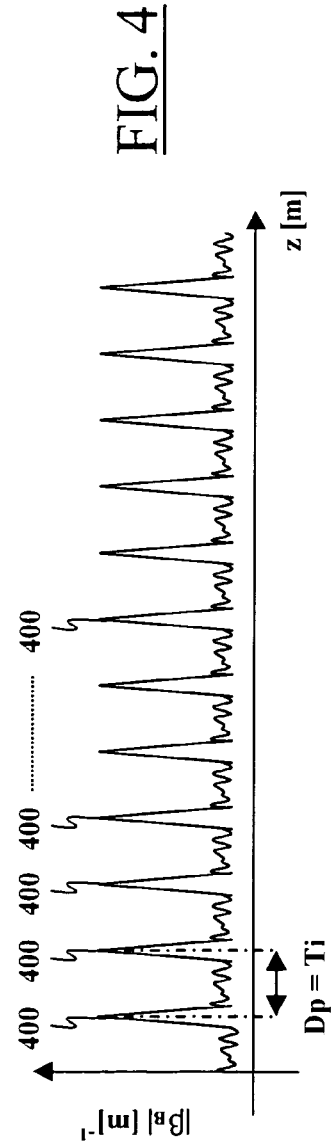
Figure 5:
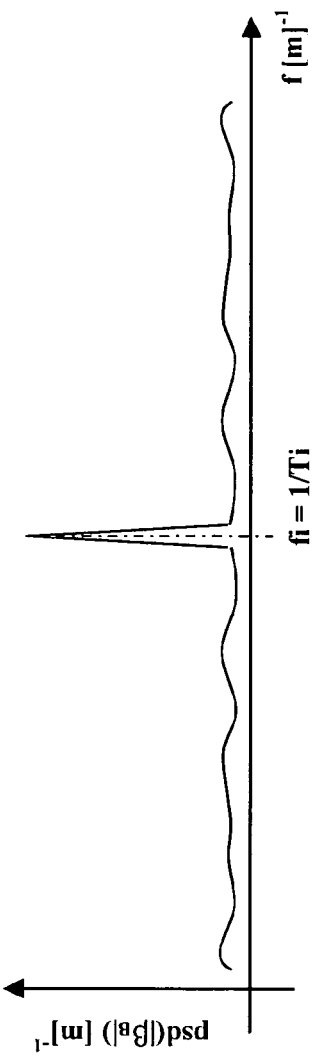
Figure 7:
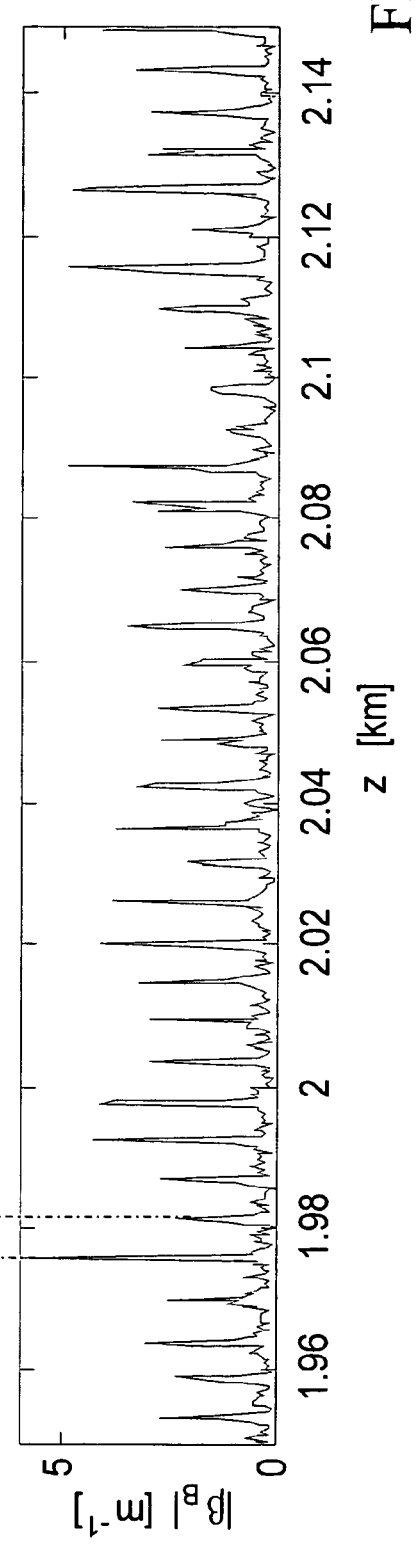
Figure 6:
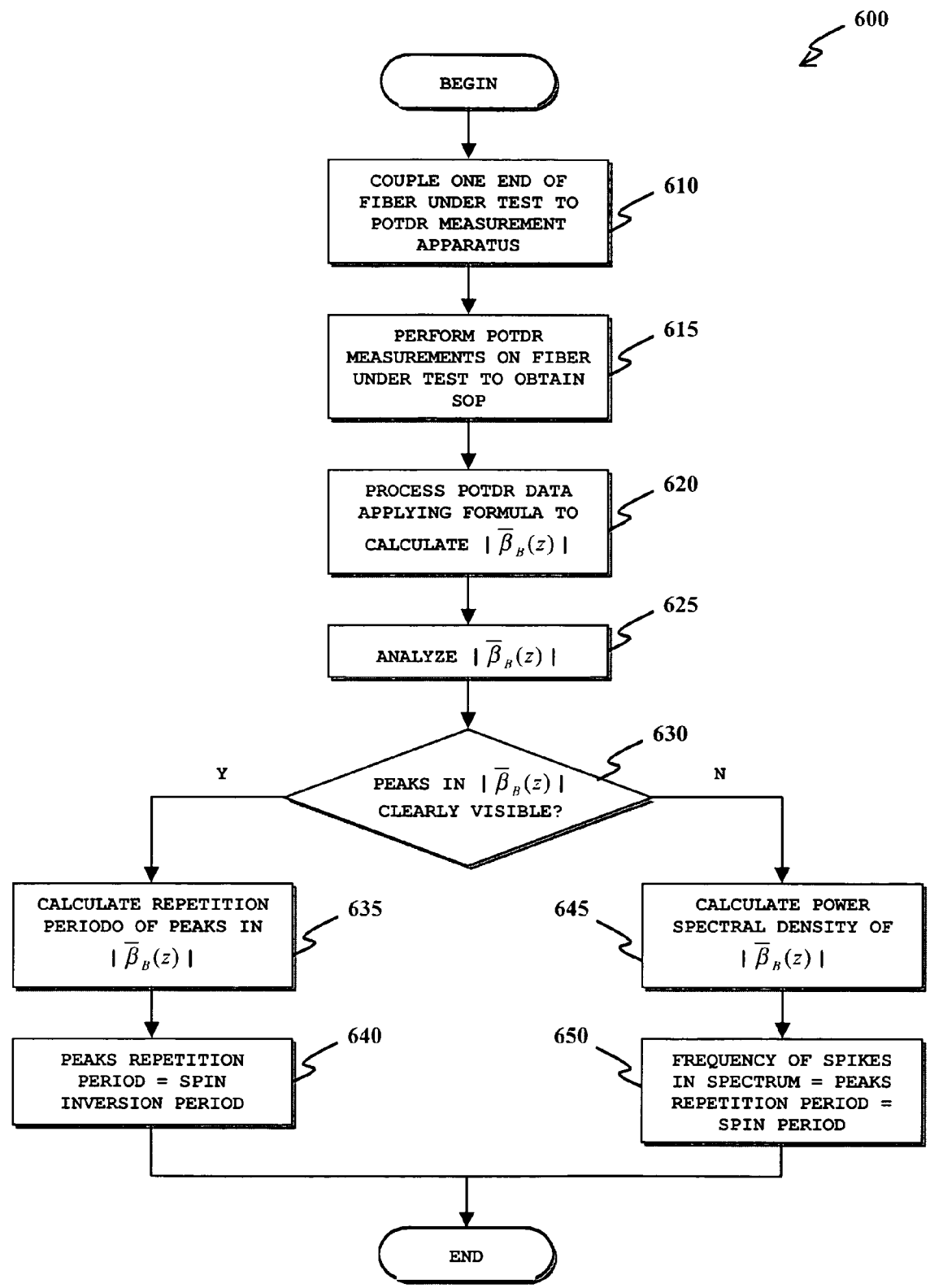
Figure 9:
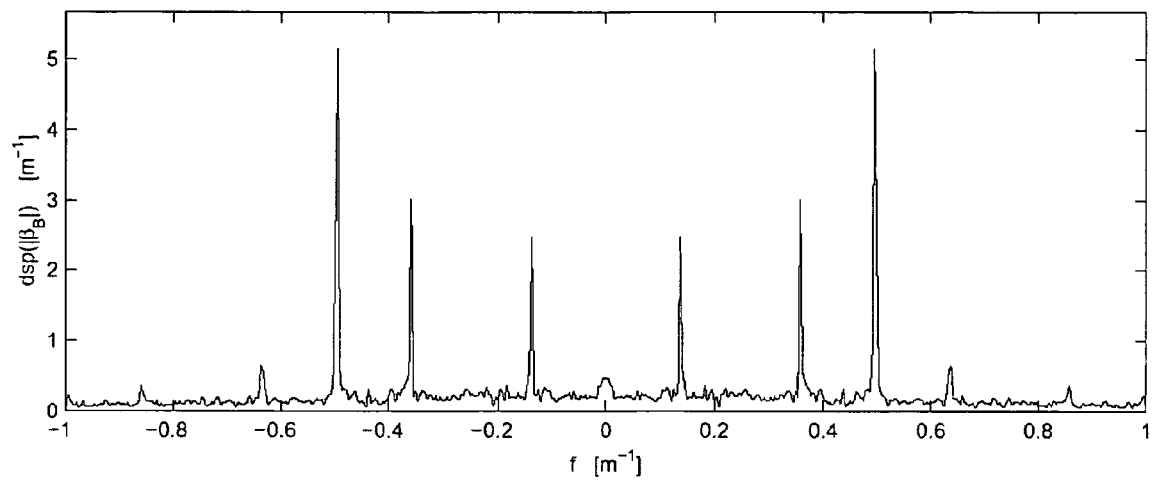
Figure 10:
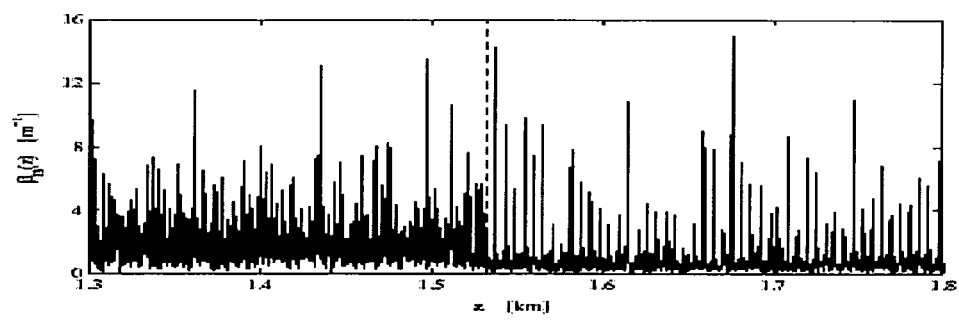
Figure 11:
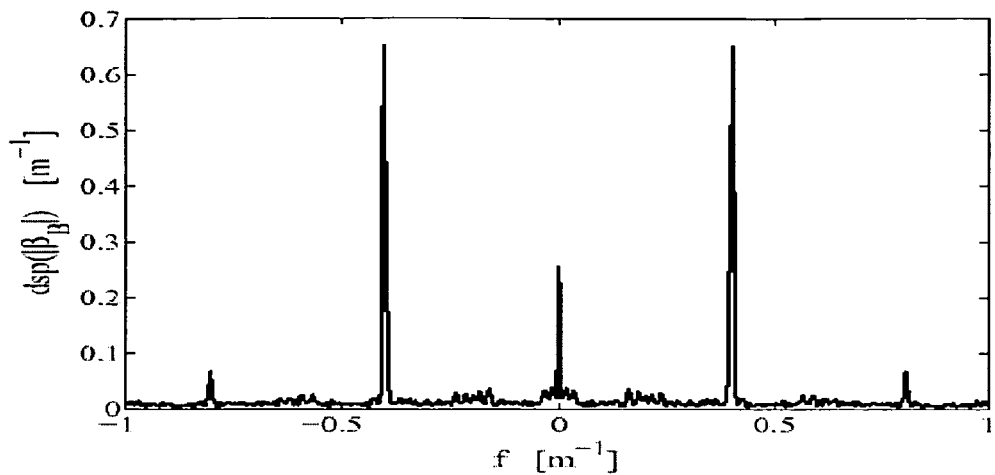
Figure 13:
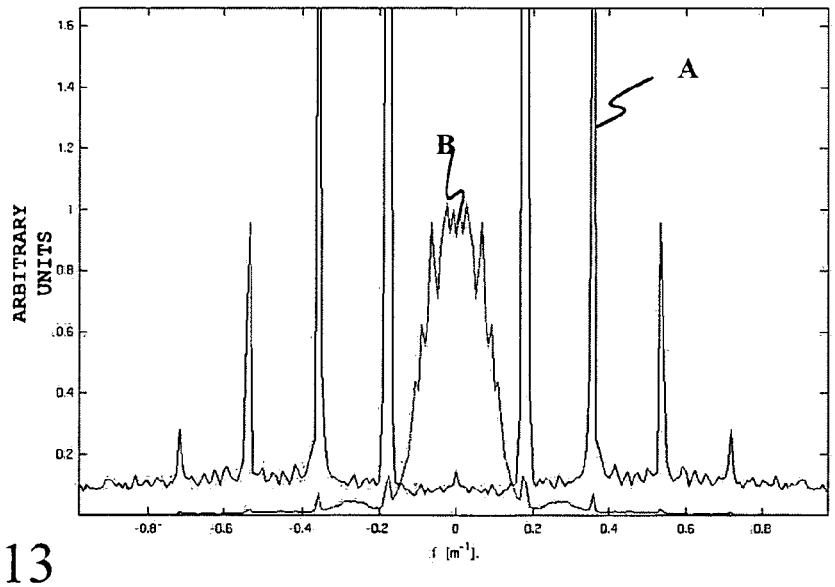
Figure 14:
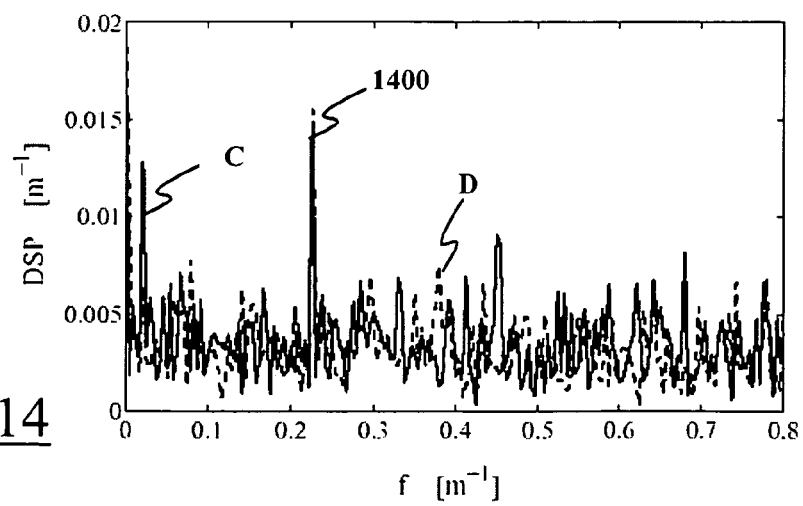
Figure 12A:
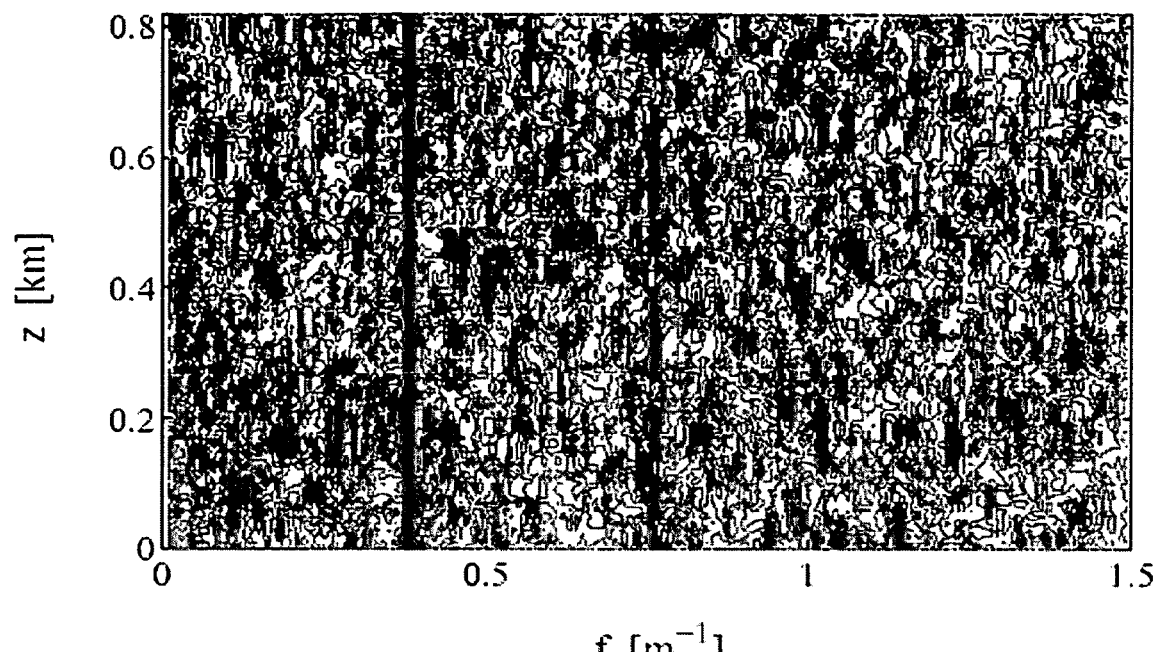
Figure 12B:
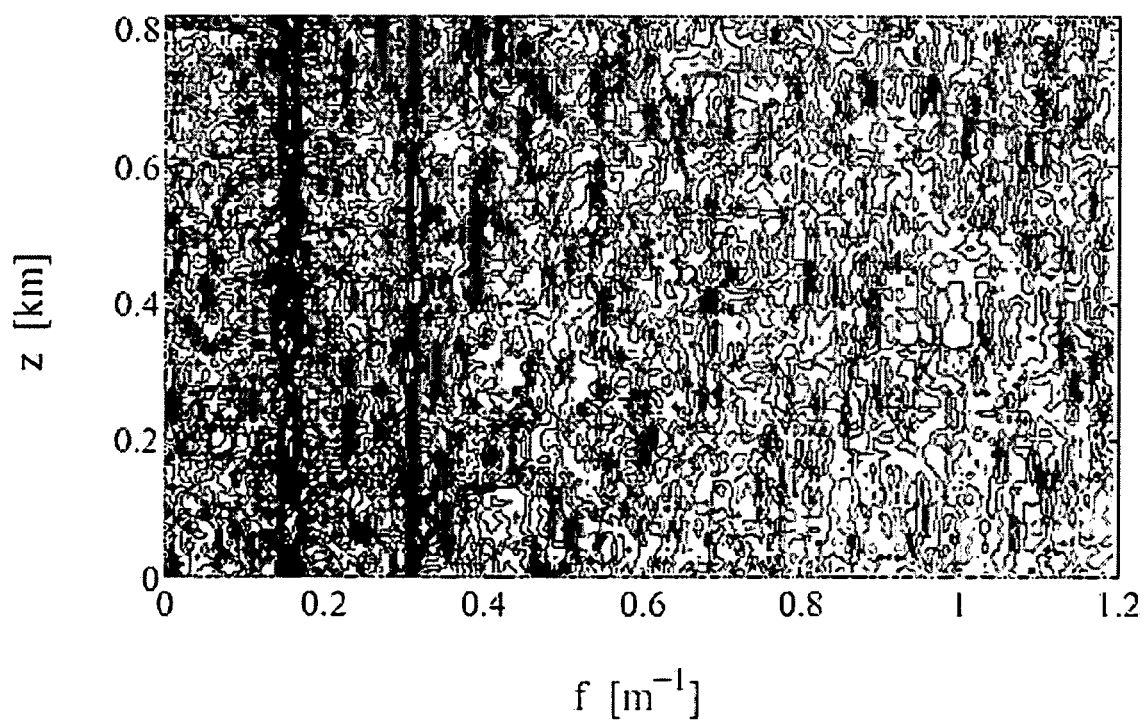

FIG. 3 schematically shows an apparatus for determining spin characteristic parameters of the spun fiber applying a method according to an embodiment of the present invention;

FIG. 4 is a schematic diagram showing the birefringence modulus as a function of the fiber length expected for a spun fiber having a spin profile similar to that of FIG. 2;

FIG. 5 is a schematic diagram showing the power spectral density of the birefringence modulus of FIG. 4;

FIG. 6 is a simplified flowchart illustrating the main steps of the method according to an embodiment of the present invention;

FIG. 7 is a diagram showing the birefringence modulus as a function of the fiber length experimentally obtained applying the method from a real fiber having the spin profile of FIG. 2;

FIGS. 8A to 8F show the results of experimental trials conducted by the Applicant on six, commercial spun optical fibers with known spin parameters;

FIG. 9 shows the result of another experimental trial conducted by the Applicant, evidencing the appearance of beat frequencies in the spectrum of the birefringence modulus;

FIG. 10 is a diagram showing the difference between the birefringence modulus of an unspun fiber section and that of a spun fiber section;

FIGS. 11 and 12A show the result of two further experimental trials conducted by the Applicant on a same fiber but with shifting spectral analysis windows of different width;

FIG. 12B shows, by way of comparison, a diagram similar to that shown in FIG. 12A, but obtained from a fiber not uniformly spun;

FIG. 13 shows, in arbitrary units, the power spectral density of the birefringence modulus of a spun fiber obtained following a method according to an embodiment of the present invention, compared to the power spectral density of the modulus of a birefringence vector component obtained following a method known in the art, which involves performing the spectral analysis of the SOP components; and FIG. 14 is a diagram similar to that of FIG. 7, obtained by calculating, for a same fiber, twice the birefringence modulus, changing the fiber conditions.

With reference to the drawings, in FIGS. 1 and 2, a short section 100 of a spun optical fiber 105 is schematically shown. In particular, but merely by way of example, the fiber 105 is an alternately-spun fiber, with an alternate and a trapezoidal spin profile 200, schematically depicted in FIG. 2 (expressed in terms of spin rate, in turns per meter, as a function of fiber length, z axis, in meters), imparted to the fiber by properly controlling a spinner device during the fiber drawing process.

Optical fiber sub-sections 110+ and 110− are thus defined wherein the fiber is spun, e.g., clockwise and counter-clockwise, respectively, the sub-sections 110+ and 110− being alternated to one another along the fiber. Within the generic sub-section 110+, 110−, moving along the z axis, the spin rate initially increases (in absolute value) starting from a substantially zero value up to a maximum spin rate value SRmax (the so-called spin amplitude, approximately 5.3 m in the shown example), remains constant at that value for a certain length, then decreases to zero. The sites 115 at which the spin rate falls to zero are the spin-direction inversion sites; in case the spin function is periodic, as in the example herein considered, the distance between consecutive inversion sites is the spin inversion period Ti (approximately 5.5 m in the example), which is half as large as the spin function period T (11 m). The exemplary fiber herein considered has a minimum spin pitch (where "spin pitch" indicates the length of fiber required to complete a turn) approximately equal to 0.19 m in correspondence with the spin maximum amplitude. The values of the spin pitch sensibly increase around the inversions.

Referring now to FIG. 3, there is schematically depicted an exemplary experimental set-up including an apparatus for determining spin characteristic parameters of a spun optical fiber such as the fiber 105, by applying a method according to an embodiment of the present invention.

The apparatus, globally indicated as 300, comprises a wavelength-tunable optical source, i.e. a laser 305, adapted to generate light whose wavelength is finely controllable. The laser 305, for example an external cavity laser, is controlled by a pulse generator 335.

As known in the art, performing a POTDR measurement on an optical fiber typically involves stimulating the fiber with an optical radiation having at least three different polarization states in three different measurements. To this purpose, the laser 305 radiation is supplied to a polarization controller device 310, or polarization state generator, which applies the required polarization to the light generated by the laser 305. In particular, if three polarization states are used to perform the measurement, the polarization controller device 310 may for example apply rectilinear polarization states at 0°, 45° and 90°.

Preferably, an optical amplifier 315 is provided for amplifying the polarized light.

The (amplified) polarized light is fed to a device arrangement 320 adapted to send the polarized light into an optical fiber to be measured, and for collecting the light backscattered from the fiber. Generally speaking, the device arrangement 320 may be represented as a simple optical coupler with a first and a second unidirectional ports for the input of the polarized light and for the output of the backscattered light, respectively, and a bi-directional port for the connection to the fiber to be measured; the device arrangement 320 may include, as in the shown exemplary embodiment, an acoustic-optical coupler with an acoustic-optical modulator 325 controlling an acoustic-optical switch 330. The acoustic-optical modulator 325 is controlled by a suitable signal generator, for example the same pulse generator 335 that controls the laser 305, with the purpose of controllably toggling the switch 330 between its two positions.

A polarization analyzer 340 is connected to the second unidirectional port of the device arrangement 320, for receiving the backscattered light and analyzing the polarization state thereof.

The output of the polarization analyzer 340 is fed to a further splitter 345, having a first output to which a data processing apparatus 350 is connected, essentially an OTDR, for processing the data supplied by the polarization analyzer 340 (particularly, for recording the backscattered power), and a second output to which there is connected a photodetector 355, for example a photodiode, controlling the pulse generator 335.

It is observed that an experimental set-up as that depicted in FIG. 3 and described above is described in the already cited paper by A. Galtarossa et al. "Statistical characterization of fiber random birefringence"; a substantially identical set-up is also described in the other already cited paper by A. Galtarossa et al. "Measurements of beat length and perturbation length in long single-mode fibers".

Apparatuses suitable to perform POTDR on optical fibers are also disclosed in the U.S. Pat. No. 6,229,599 and in the International application publication No. WO 01/37459.

The fiber to be measured is connected at one end thereof to the bi-directional output of the switch 330. Preferably, the fiber is deployed in a way that does not alter the results of the measures, e.g. it is wound on a bobbin 360 (a drawing bobbin, for example) at nominal zero tension, to reduce the effects of the finite radius of the bobbin on the measures (the measurement accuracy can be altered by a high winding tension that can induce a change in birefringence).

As known in the art, POTDR measures the evolution of the SOP of the light backscattered along an optical fiber, for different polarization states of the input light. The experimental set-up of FIG. 3 allows performing POTDR, and is thus adapted to measure the SOP of the backscattered electromagnetic field in a fiber, once it is connected to the bi-directional output of the switch 330. To this purpose, the laser 305 is made to generate light at a prescribed wavelength, e.g. 1532 nm, in pulses of a prescribed duration, e.g. 5 ns, and with a prescribed sampling step of, e.g., $\Delta z = 0.6$ m that can be selected on the OTDR used in the set up.

As discussed in, e.g., the already cited paper by A. Galtarossa "Statistical characterization of fiber random birefringence" (incorporated herein by reference), the evolution as a function of distance along the fiber of the SOP of the backscattered field is described by the equation:

$$\frac{\partial \hat{s}_B}{\partial z} = \overline{\beta_B}(z) \times \hat{s}_B$$

where $\hat{s}_B(z)$ is the Stokes unit vector that represents the SOP of the field backscattered at point z along the fiber.

The quantity $\overline{\beta}_B(z)$ is the round-trip birefringence vector, and it is related to the fiber properties by the expression:

$$\overline{\beta}_B(z) = 2MR^T(z)\overline{\beta}_L(z)$$

where $\overline{\beta}_L(z) = (\beta_1, \beta_2, 0)$ is the linear component of the local birefringence vector, R (z) is the Muller matrix that represents the fiber, $M = \text{diag}(1,1,-1)$ is a diagonal matrix, and the superscript T indicates transposition.

According to the Müller matrix method, in order to measure the round-trip birefringence vector $\overline{\beta}_B(z)$ the Stokes unit vector $\hat{s}_B(z)$ for two different input SOPs is firstly measured. Then, the matrix $R_B(z)$ that represents the round trip can be determined, and hence $R_\Delta(z) = R_B(z+\Delta z)R_B^T(z)$ can be calculated (where $\Delta z$ is the sampling step). Finally, the round-trip birefringence vector $\overline{\beta}_B(z)$ can be determined by means of the following equations:

$$2\cos(|\overline{\beta}_B(z)|\Delta z) = TrR_\Delta - 1$$

$$2(\overline{\beta}_B(z) \times)\sin(|\overline{\beta}_B(z)|\Delta z) = R_\Delta - R_\Delta^T$$

where $|\overline{\beta}_B(z)|$ and $\overline{\beta}_B(z)$ are the modulus and the direction of the round-trip birefringence vector $\overline{\beta}_B(z)$ and Tr is the trace of the matrix.

Thus, with the experimental set-up of FIG. 3 the modulus $|\overline{\beta}_B(z)|$ of the round-trip birefringence vector $\overline{\beta}_B(z)$ for a fiber under test can be calculated. Let it be assumed that the fiber 105 of FIG. 1, spun with the spin function represented in FIG. 2, is measured with the apparatus of FIG. 3, and that the birefringence modulus $|\overline{\beta}_B(z)|$ is calculated as indicated above. A diagram as the one schematically represented in FIG. 4 (birefringence modulus vs position along the fiber) is obtained. In the diagram, the presence of repetitive peaks 400 can be appreciated. The Applicant has found that the repetitive peaks 400 repeats periodically and have a repetition period Dp (distance between adjacent peaks) corresponding to the spin inversion period Ti; once the spin inversion period Ti is known, the spin period T can easily be determined (T=2*Ti). Thus, by observing the birefringence modulus vs position along the fiber calculated by processing the POTDR signals measured for a spun fiber, information about the spin characteristic parameters of the spun fiber can be obtained, particularly the spin period.

The Applicant explanation of this phenomenon is based on the observation that POTDR has a finite spatial resolution. As already known in the art, for an unspun fiber having properties almost constant over the POTDR spatial resolution, the SOP of the backscattered signal allows evaluating accurately the fiber birefringence. On the other hand, if the fiber is spun, it undergoes a complete rotation around its axis in a length (pitch) equal to the reciprocal of the local spin rate. This length is typically of about tens of cm (for example, the minimum spin pitch of 0.19 m of the fiber 105). A POTDR typically does not have the spatial resolution required to measure the SOP evolution along a spin pitch, and so the birefringence cannot be measured accurately. The birefringence is measured better if the spin rate is low, i.e. the spin pitch large.

For an alternate spin function such as the spin function depicted in FIG. 2, the spin direction repeatedly changes from clockwise to counter-clockwise and vice-versa. If this change is not abrupt but instead smooth enough, the spin pitch varies from a minimum, corresponding to the spin maximum amplitude (SRmax, in FIG. 2), to a maximum, across the inversion position, where the spinner slows down and reaches the zero, to change direction.

Only there, i.e. at the spin-direction inversion sites 115, where the fiber parameters change slowly, the POTDR, having a limited spatial resolution, can take a birefringence measurement. It is for this reason that the birefringence modulus measurement shows a periodicity that corresponds to the spin inversion period. If the alternate spin profile is periodic, as in the exemplary case of FIG. 2, the fiber birefringence modulus shows clear periodicity, corresponding to the spin period.

Thus, the method of determining the spin period according to this embodiment of the present invention is based on a limitation of the POTDR: a limited spatial resolution.

Therefore, according to an embodiment of the present invention, a method as schematically shown in the flow-chart 600 of FIG. 6 is set forth for determining the characteristic spin parameters of a spun fiber.

Firstly, one end of the fiber under test is coupled to the measurement apparatus schematically depicted in FIG. 3 (block 610). To this purpose, as mentioned in the foregoing, the optical fiber is preferably deployed in such a way as not to alter the birefringence thereof, for example the fiber is spooled at a nominally zero tension on a bobbin, or it is cabled.

Then, POTDR measurements are performed on the fiber to determine the SOP evolution (block 615). To this purpose, a POTDR with a sufficiently low spatial resolution is employed, unable to resolve the SOP in the spin pitch. It is observed that this is usually the case for current POTDRs; however, this is not a concern, because the spatial resolution of the POTDR might alternatively be set to a suitably low value; if necessary, repeated POTDR measurements at different spatial resolution might be performed.

The data obtained from the POTDR measurements are then processed (by the OTDR instrument 350 of FIG. 3, which is intended to include data processor means 365, e.g. a suitably programmed computer, and by a dedicated software that is programmed to merge the spatial information provided by the OTDR with the polarization information obtained by the polarization analyzer) so as to calculate the birefringence modulus $|\overline{\beta}_B(z)|$, for example according to the formula derived above (block 620). There is thus obtained a curve of the dependence of the birefringence modulus $|\overline{\beta}_B(z)|$ on the position along the fiber.

The birefringence modulus $|\overline{\beta}_B(z)|$ is then analyzed (block 625) to determine the presence of peaks (such as the peaks 400) having a repetition regularity; if such peaks are clearly visible in the space domain (decision block 630, exit branch Y), the spatial repetition period of the peaks in the birefringence modulus $|\overline{\beta}_B(z)|$ is calculated (block 635): this spatial repetition period is equal to the spin inversion period Ti, thus the spin profile period T (equal to twice Ti) is finally obtained (block 640).

The Applicant has found that peaks in the birefringence modulus $|\overline{\beta}_B(z)|$ are normally clearly visible in the time domain provided that the fiber birefringence is high enough. If the birefringence is not high enough (the fiber has a low birefringence, as it is normally desirable), the peaks may be not clearly visible in the space domain (decision block 630, exit branch N).

In this case, according to an embodiment of the present invention, a spectral analysis of the calculated birefringence modulus $|\overline{\beta}_B(z)|$ is performed. In particular, the Power Spectral Density (PSD) of the birefringence modulus $|\overline{\beta}_B(z)|$ is calculated (block 645). Preferably, the PSD of the birefringence modulus $|\overline{\beta}_B(z)|$ is calculated considering a fiber section sufficiently long to reasonably containing a sufficient number of spin periods.

A diagram as that shown in FIG. 5 is thus obtained.

The PSD thus calculated allows calculating the mean inversion period over that fiber section: typically, the reciprocal of the position of the first spike in the spectrum (i.e. the reciprocal of the frequency at which the first spike is located) is the spin inversion period Ti, i.e. half of the spin period Ti. It has however to be observed that, sometimes, especially for high-birefringence optical fibers, harmonics and other undesired frequencies, such as beat frequencies or sum frequencies can be present. These undesired frequencies can be easily recognized and neglected, and only the lower frequency main peak the birefringence modulus $|\overline{\beta}_B(z)|$ spectrum (corresponding to the spin inversion period) be taken in consideration.

It is pointed out that although some of the steps of determining whether the peaks in the birefringence modulus $|\overline{\beta}_B(z)|$ are clearly distinguishable, determining the peak spatial repetition, calculating the PSD for the birefringence modulus $|\overline{\beta}_B(z)|$ and determining the frequency of the spike therein, may be carried out by a human operator, they are preferably carried out automatically by the data processor 365 in the POTDR 350. In particular, the peaks in the birefringence modulus $|\overline{\beta}_B(z)|$ and in the spectrum thereof may be determined by choosing proper threshold amplitude levels for the modules and the power spectral density, respectively. Peaks can be determined for example using a commercial software, such as Microcal™ Origin®, exploiting the routine Peak fitting.

FIG. 7 is a diagram of the birefringence modulus $|\overline{\beta}_B(z)|$ obtained according to the method set forth above for a fiber compliant with the ITU-T G.652 standard specifications. The fiber was spun during the drawing process according to the spin profile depicted in FIG. 2. The peaks are in this case rather clearly visible, and the spin inversion period Ti (equal to the peaks distance Dp) can rather easily be determined. The distance Dp between adjacent peaks in the birefringence modulus $|\overline{\beta}_B(z)|$ is approximately 5.49 m, in very good agreement with the spin profile applied to the fiber; the Applicant has also tried to perform the analysis of the birefringence modulus $|\overline{\beta}_B(z)|$ in the frequency domain, and has observed a spike in the PSD located at 0.182 $m^{-1}$.

The Applicant has widely tested the method on fibers having a known inversion spatial frequency. Fibers from a same bobbin were cabled in different cables, or in the same cable but in different tubes. The Applicant has found that the method described above allows a spin period characterization independent from the cabling process.

Six different fibers were tested. The correspondence between the spin nominal inversion period (as known a priori) and the measured birefringence distribution can be appreciated in the table below, and the PSD of the birefringence modulus $|\overline{\beta}_B(z)|$ determined for the six different fibers is shown in FIGS. 8A to 8F. It is observed that the more or less pronounced spike at the frequency 0 visible in these diagrams is due to the background level of the birefringence modulus $|\overline{\beta}_B(z)|$. In order to avoid the peak correspondent to frequency equal to zero in the power spectral density diagram of the birefringence modulus, the mean value of birefringence can be subtracted.

Table I reports the nominal and measured spin inversion frequencies of the six fibers. It can be appreciated that there is a high correspondence between the two values.

TABLE 1

Figure 8A:
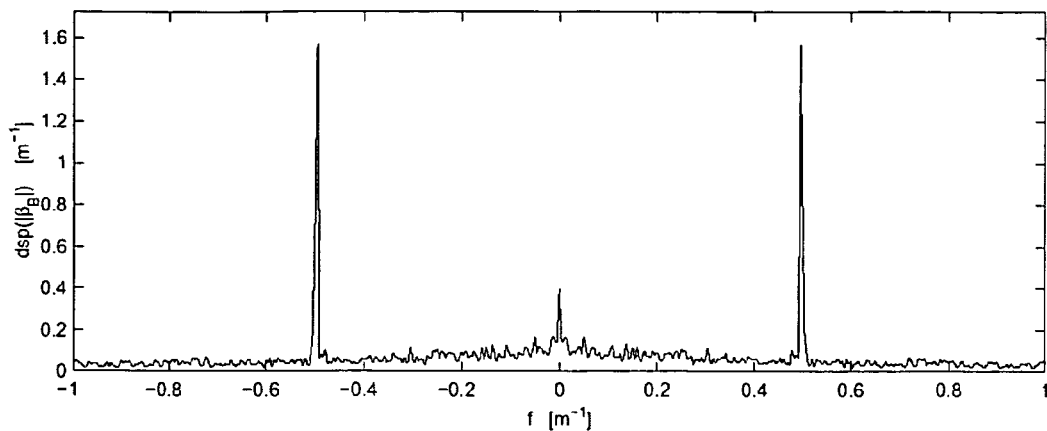
Figure 8B:
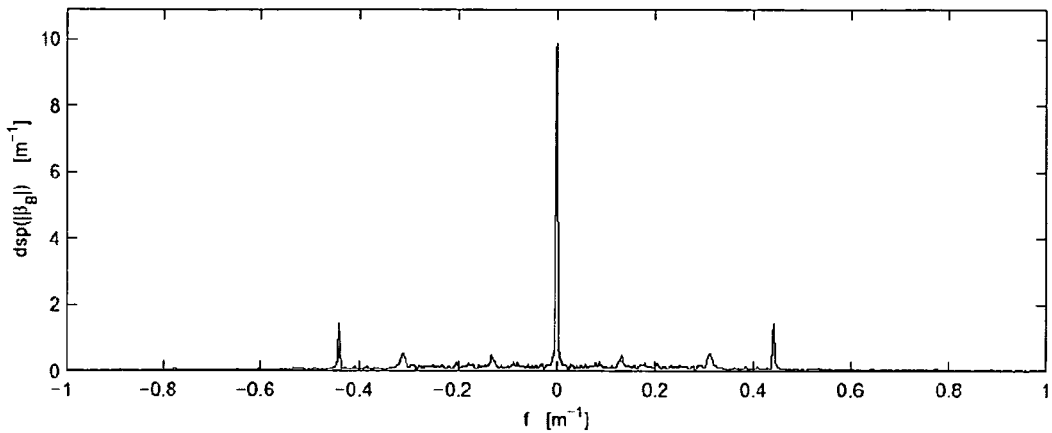

| Spin inversion frequency (1/m) | | |
|---|---|---|
| Nominal | Measured by POTDR | Figure |
| 0.500 | 0.496 | FIG. 8A |
| 0.444 | 0.443 | FIG. 8B |

TABLE 1-continued

Figure 8C:
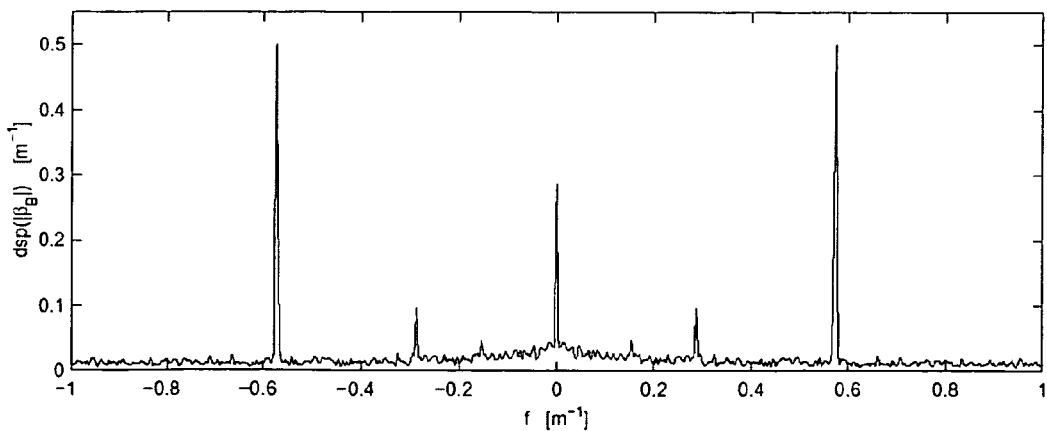
Figure 8D:
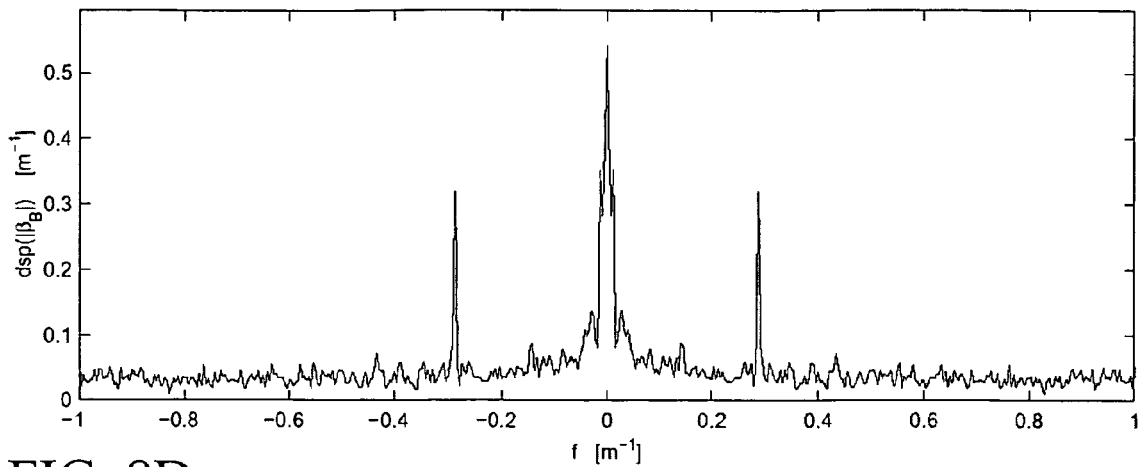
Figure 8E:
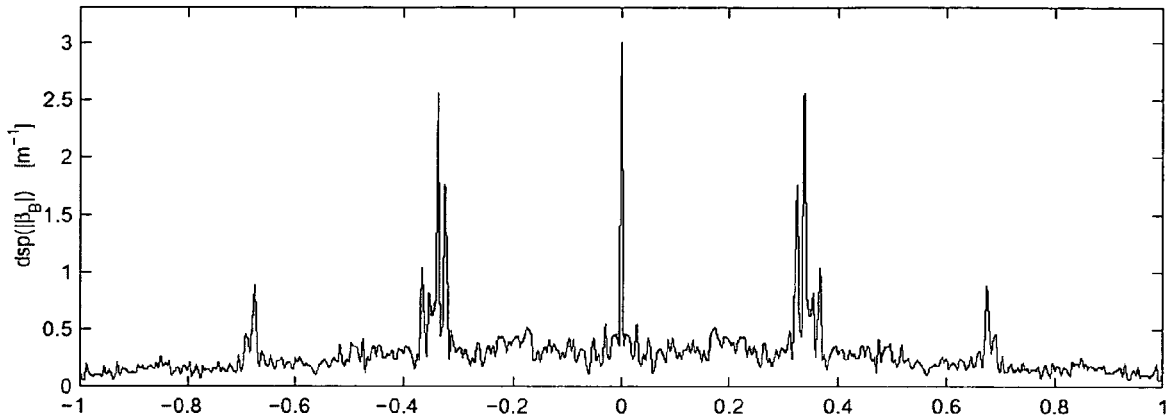
Figure 8F:
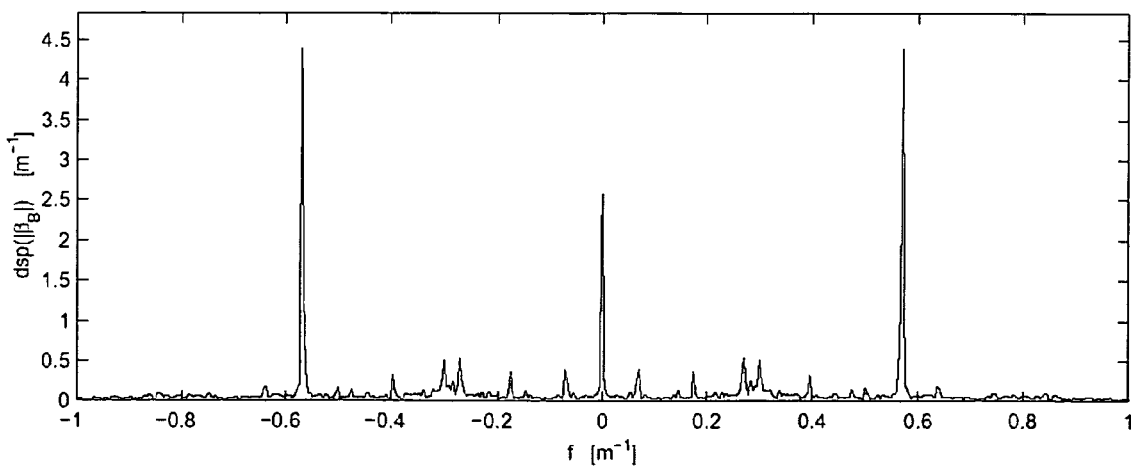

| Spin inversion frequency (1/m) | | |
| --- | --- | --- |
| Nominal | Measured by POTDR | Figure |
| 0.571 | 0.574 | FIG. 8C |
| 0.333 | 0.340 | FIG. 8D |
| 0.278 | 0.288 | FIG. 8E |
| 0.571 | 0.571 | FIG. 8F |

The PSD diagram in FIG. 9 refers to a fiber having a high birefringence, thereby the frequencies in the spectrum beat: one frequency peak is thus positioned at the frequency sum of other two. Again, the nominal inversion frequency is 0.500 $m^{-1}$, the main peak is positioned at 0.497 $m^{-1}$, and two peaks at 0.137 $m^{-1}$ and 0.360 $m^{-1}$ appear in the spectrum (0.497=0.137+0.360).

The method according to the described embodiment of the invention allows determining which part of an optical fiber has been spun. Referring to FIG. 10, a spun fiber section (at the right in the diagram, where the pattern in the birefringence modulus $|\bar{\beta}_B(z)|$ is regular and periodic) follows an unspun section (at the left, where the pattern is neither regular nor periodic). It is pointed out that such a variation of the measured birefringence along the fiber was not expected, because the local birefringence of the fiber does not change due to the spinning (as reported for example in A. J. Barlow et al., "Anisotropy in spun single mode fibers", Electronics Letters, 1982, Vol. 18, No. 5). The Applicant has understood that the variation is due to the limited spatial resolution of the POTDR: the POTDR pulse and its processing do not reach the resolution of a spin pitch (in the exemplary case considered, $1/5.3$ m, approximately 190 cm), required to measure the birefringence where the fiber changes orientation due to spinning; there, the measured birefringence is thus not accurate. Only at the inversion of spin direction, i.e. where the local spin rate is lower, a more accurate value for birefringence is found.

It is stressed that the inaccuracy in the birefringence is not at all a concern, since the aim is not to evaluate the birefringence, but rather to use the calculated birefringence modulus as a marker for the inversion sites.

The resolution of the spin period measurement is inversely proportional to the number of periods evaluated, and so to the length of fiber analyzed.

The method according to the described embodiment of the present invention can also be used to evaluate how homogeneously the spin defined by the prescribed spin function has been transferred onto the fiber. This can be done by carrying out a spectral analysis of the birefringence modulus $|\bar{\beta}_B(z)|$ by repeating the calculation described in the foregoing in different measurement windows, corresponding to different fiber sections along the fiber length. Particularly, the calculation can be repeated considering a measurement window that is made to shift along the fiber ("shifting window"), covering the entire length of the fiber. The spatial resolution of the measurement depends on the width of the measurement window. A higher spatial resolution, corresponding to a smaller measurement window, reduces the number of peaks in the birefringence modulus, and so the accuracy of the position of the peak in the spectrum. Again, if the birefringence modulus is so high that the peaks are directly visible in the space domain (i.e. in the function birefringence modulus $|\bar{\beta}_B(z)|$ vs length), the window size can be reduced to include just one spin inversion site 115. On the other hand, if the birefringence is low the window size should be increased. The Applicant has found that a reasonable length for the window is 100 m, and can be shifted at steps of 10 m along the fiber.

For example, a fiber spun according to a sinusoidal spin profile having nominal inversion frequency of 0.430 $m^{-1}$ was measured by determining the spectrum over a POTDR measurement extending over 2 km. The PSD diagram of FIG. 11 has been obtained which shows a peak at 0.404 $m^{-1}$. The width of the shifting window was of 100 m, the spectrum was repeatedly determined over the entire range by shifting the window of steps of 10 m. All the spectra recorded in this way can be represented in a single plot, as in the diagram of FIG. 12A, referring to a fiber having a spin inversion period of approximately 2.63 m, where in ordinate the position of the shifting window along the fiber is provided, while in abscissa the frequency at which the peak in the spectrum for each window position is indicated. Looking at the diagram, it can be ascertained that the spin was in this case imparted homogeneously.

In the diagram of FIG. 12A, a black vertical line of relatively uniform intensity is indicative of the fact that the spin has been imparted to the fiber rather homogeneously. By way of comparison, the diagram of FIG. 12B shows the corresponding result that has been obtained for a fiber (having a different spin inversion period equal to approximately 4.44 mm) to which the spin is not imparted homogenously: in this case, the non-uniformity of the black vertical line indicates that the spin period has not been imparted homogeneously along the fiber, or that the fiber birefringence is not homogeneous.

Typically, the technique allows to determine the mean inversion frequency with an accuracy up to 0.005 $m^{-1}$ (difference between the nominal value of spin inversion frequency and the value measured with the technique). The larger the window over which the PSD is performed, the more accurate is the mean inversion frequency over that window.

Typically a shifting windows width can vary between a few meters and the POTDR dynamic range, depending on the fiber birefringence.

FIG. 13 shows the power spectral density of the birefringence modulus of a spun fiber obtained following a method according to an embodiment of the present invention, compared to the power spectral density of a birefringence vector component, calculated following the method discussed in the already cited paper by J. G. Ellison et al., "Using polarimetric optical time domain reflectometry to extract spun fiber parameters", involving the execution of a spectral analysis of the SOP components. In the drawing, the ordinate axis is in arbitrary units, because the power spectral density of the birefringence modulus is expressed in $m^{-1}$, while that of the magnitude of the birefringence vector component is expressed in meters. As mentioned, the Authors of that paper consider such a spectral analysis of the components of SOP too difficult to extract useful information. In order to compare the spectral analysis of SOP components and the spectral analysis of birefringence modulus, regardless of the POTDR used, the Applicant measured a spun fiber, and from the same experimental data, the two analyses has been performed. Curve A shows the result of the method according to the described embodiment of the invention, whereas curve B refers to the results obtained applying the technique of Ellison et al. Curve B exhibits small spikes (at approximately 0.2 $m^{-1}$, 0.4 $m^{-1}$, 0.6 $m^{-1}$) that are not clearly visible, particularly much less visible than the spikes in curve A. This was recognized as a limit of the technique by the Authors themselves. Indeed, they proposed another technique based on twisting limited length of fiber It may sometimes happen that, even after having performed the spectral analysis of the birefringence modulus, it is not clearly and unambiguously evident which spike in the spectrum corresponds to a spin inversion period, because of the noise superimposed; this is for example the case of curve C (continuous line) in FIG. 14; in such a case, it may be useful to repeat the measurement and calculations for a different condition of the fiber under test, for example changing the fiber end connected to the measurement instrument, or waiting some time before repeating the measurement, or slightly perturbing the fiber with, e.g., vibrations or temperature changes. If this is done, a different spectra, for example the one represented by curve D (dashed line) is obtained. The spin inversion period can thus be determined by observing that substantially only one spike is common between the curves C and D, namely the spike 1400 corresponding to the spin inversion period.

The method herein described can be used to easily determine if a fiber is spun or not, and this apparently simple information may in the practice be very useful. As mentioned in the foregoing, the PMD of unspun optical fibers varies with time, temperature and vibrations much more than that of spun fibers; as a consequence, a single PMD measurement of an unspun fiber is poorly representative of the system PMD, and several repeated PMD measurements need to be performed: at least from the point of view of the time involved, this is highly disadvantageous. Establishing that a fiber, especially a cabled one, is spun is thus very useful, because it gives an indication of the fact that even a single PMD measurement (or a limited number of PMD measurements) provides a relatively accurate estimation of the fiber PMD.

With respect to the known state of the art, the method described herein allows measuring the spin period with higher accuracy, over longer length, and without having to manipulate, e.g. twisting the fiber to be characterized.

Another advantage of the described method is that it requires only a single end of the fiber, and several kilometers of fiber can be measured.

The described method can in general be applied to fibers spun with a spin function such that the spin imparted on the fiber does not have a constant spatial frequency: in this case, the power spectral density of the birefringence modulus will exhibit two or more peaks (not considering the peak at the zero frequency), corresponding to the different component frequencies.

Also, the method can be exploited to characterize the spin characteristics of fibers having a variable spin profile which is not alternated (clockwise and counter-clockwise), provided that the spin function periodically slows down, with a certain periodicity.

The method described can be applied to single mode optical fiber, and particularly to step index, dispersion shifted and non-zero dispersion fibers.

The method described is independent from the fiber production process; for example, the Applicant has tested the method on MCVD, PCVD, OVD, VAD fibers, both in cable and in bobbin.

Although the technique of the present invention makes preferably use of the birefringence modulus to determine the fiber spin parameters, other quantities may be used as well.

In general, it is possible to use other spatial functions which are related to the spatial first derivative of at least one of the components of the SOP function.

In fact, depending on the particular representation, the SOP function is defined by a plurality of components whose first spatial derivative varies with the same periodicity. For example, in the Stokes representation, the SOP function is represented by a vector defined by four components $S_0$, $S_1$, $S_2$, $S_3$, and at least the three components $S_1$, $S_2$, $S_3$ have first spatial derivatives that vary with the same periodicity. Therefore, by calculation of the first spatial derivative of any of the components $S_1$, $S_2$, $S_3$, a spatial function is obtained whose periodicity is equivalent to that of the birefringence modulus.

The invention claimed is:

1. A method of determining characteristic spin parameters of a spun optical fiber, comprising:
    performing optical time-domain reflectometry measurements on the fiber, so as to obtain a state of polarization (SOP) spatial function from a backscattered electromagnetic field, said SOP spatial function being defined by a plurality of components; and
    processing the SOP spatial function by:
    calculating a further spatial function related to the spatial first derivative of at least one of said components of the SOP spatial function;
    identifying a spatial periodicity of said further spatial function; and
    determining said characteristic spin parameters as a function of said spatial periodicity.

2. The method according to claim 1, in which said characteristic spin parameters comprise at least one of a spin inversion period and a spin period.

3. The method according to claim 2, in which said further spatial function is a birefringence modulus.

4. The method according to claim 3, in which said determining the characteristic spin parameters comprises locating peaks in the birefringence modulus, and determining the spin inversion period based on a distance between the peaks.

5. The method according to claim 3, further comprising:
    calculating a spectrum of the birefringence modulus;
    analyzing the calculated spectrum to locate at least one spike; and
    determining the spin inversion period based on spatial frequency of the spike.

6. The method according to claim 5, in which said spectrum is calculated in correspondence of a measurement window of optical fiber length of prescribed width, the method further comprising:
    causing the measurement window to shift along the fiber.

7. The method according to claim 1, in which said performing optical time-domain reflectometry measurements on the fiber and calculating a further spatial function related to the spatial first derivative of at least one of said components of the SOP spatial function is repeated at least once after changing the fiber conditions.

8. The method according to claim 6, in which said changing the fiber conditions comprises one or more among changing a fiber end at which the optical time domain reflectometry measurements are performed, vibrating the fiber, causing the fiber temperature to vary, waiting a time before repeating the measurements.

9. An apparatus for determining characteristic spin parameters of a spun optical fiber, comprising:
    a source of electromagnetic radiation optically coupled to the fiber;
    a POTDR measurement apparatus optically coupled to the fiber to obtain a state of polarization (SOP) spatial function from a backscattered electromagnetic field, said SOP spatial function being defined by a plurality of components; and
    a data processor for processing the SOP spatial function, wherein the data processor provides in output:
a further spatial function related to the spatial first derivative of at least one of said components of the SOP spatial function;
a spatial periodicity of said further spatial function; and
said characteristic spin parameters as a function of said spatial periodicity.

10. The apparatus according to claim 9, in which said further spatial function is a birefringence modulus.

11. An apparatus for determining characteristic spin parameters of a spun optical fiber, comprising:
a source of electromagnetic radiation optically coupled to the fiber;
a POTDR measurement apparatus optically coupled to the fiber to obtain a State Of Polarization (SOP) spatial function from a backscattered electromagnetic field, said SOP spatial function being defined by a plurality of components; and
a data processor for processing the SOP spatial function, wherein the data processor comprises:
a calculator data processing module calculating a further spatial function related to the spatial first derivative of at least one of said components of the SOP spatial function;
an identifier data processing module identifying a spatial periodicity of said further spatial function; and
a characteristic spin parameters determination data processing module determining said characteristic spin parameters as a function of said spatial periodicity.

* * * * *